(12) United States Patent
So et al.

(10) Patent No.: US 8,554,134 B2
(45) Date of Patent: Oct. 8, 2013

(54) METHOD AND DEVICE FOR COMMUNICATING USING NETWORK CODING SCHEME

(75) Inventors: Jung Min So, Suwon-si (KR); Rakesh Taori, Suwon-si (KR); Mi-Sun Do, Suwon-si (KR); Seong-Lyun Kim, Seoul (KR); June Hwang, Seingnam-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 1370 days.

(21) Appl. No.: 12/264,311

(22) Filed: Nov. 4, 2008

(65) Prior Publication Data

US 2009/0181615 A1    Jul. 16, 2009

(30) Foreign Application Priority Data

Jan. 15, 2008 (KR) .................. 10-2008-0004535

(51) Int. Cl.
*H04B 3/36* (2006.01)
*H04W 88/04* (2009.01)

(52) U.S. Cl.
USPC ............... 455/7; 455/23; 455/447; 455/452.1

(58) Field of Classification Search
USPC .................. 455/11.1, 3.01, 7, 15, 452.1, 450, 455/23, 509, 414.1, 447, 453, 13.2, 17, 20, 455/24, 67.11; 370/335, 280
See application file for complete search history.

(56) References Cited

U.S. PATENT DOCUMENTS

| | | | |
|---|---|---|---|
| 7,020,436 B2 * | 3/2006 | Schmutz | 455/9 |
| 2005/0232183 A1 * | 10/2005 | Sartori et al. | 370/319 |
| 2007/0280172 A1 * | 12/2007 | Tan et al. | 370/335 |
| 2008/0188177 A1 * | 8/2008 | Tan et al. | 455/11.1 |

FOREIGN PATENT DOCUMENTS

| | | |
|---|---|---|
| KR | 10-2007-0038651 | 4/2007 |
| KR | 10-2007-0038658 | 4/2007 |
| KR | 10-2007-0073152 | 7/2007 |
| KR | 10-2007-0074256 | 7/2007 |
| WO | 10-2007-0035869 | 4/2007 |

\* cited by examiner

*Primary Examiner* — John J Lee
(74) *Attorney, Agent, or Firm* — NSIP Law

(57) ABSTRACT

A communication system, a relay station, a mobile station, a base station, and a method using a network coding scheme are provided. A communication system includes a relay station, a mobile station, and a base station. A relay station includes a message receiving unit to receive a downlink message transmitted from a base station and an uplink message transmitted from a mobile station, a message generation unit to generate a network coded message by coding the downlink message and the uplink message according to a network coding scheme, and a message transmission unit to transmit the network coded message to the base station and the mobile station during the same time slot.

23 Claims, 8 Drawing Sheets

METHOD AND DEVICE FOR COMMUNICATING USING NETWORK CODING SCHEME

CROSS-REFERENCE TO RELATED APPLICATION

This application claims the benefit under 35 U.S.C. §119(a) of a Korean Patent Application No. 2008-4535, filed on Jan. 15, 2008 in the Korean Intellectual Property Office, the entire disclosure of which is incorporated herein by reference.

TECHNICAL FIELD

The following description relates to a method and device for communicating, and more particularly, to a relay station (RS), a base station (BS), and a mobile station (MS) that communicate using a network coding scheme, and methods thereof.

BACKGROUND

Several technologies including Orthogonal Frequency Division Multiplexing (OFDM), Multiple Input Multiple Output (MIMO), a smart antenna, and the like have been introduced to accomplish high data rates. However, where a high frequency band is used, a shadow area in downtown areas is expected to increase.

Research on a relay station is being actively pursued to solve a problem caused by the shadow area and to improve a data rate. Recent technologies related to the relay station include an amplify-and-forward scheme of power, a decode-and-forward scheme, a reconfiguration/reallocation-and-forward scheme, and the like.

Where a relay station is included in a communication system, a wireless resource such as a time slot for the relay station is typically needed. For example, it is assumed that the relay station operates between a base station and a mobile station. The base station transmits a message A to the relay station during a time slot T1, T1 being one of downlink time slots, and the mobile station transmits a message B to the relay station during a time slot T2, T2 being one of uplink time slots. In this case, the relay station transmits the message A to the mobile station during a time slot T3, T3 being one of the downlink time slots, and transmits the message B to the base station during a time slot T4, T4 being one of the uplink time slots.

In the example above, a minimum of four time slots T1, T2, T3, and T4 are needed to exchange the message A and message B between the base station and the mobile station via the relay station.

Where the base station and the mobile station directly transceive the message A and message B without passing through the relay station, only two time slots may be needed. That is, where a relay station is added to a communication system, a wireless resource such as a time slot and the like is additionally consumed.

Accordingly, a technology for maximizing a data rate by reducing consumption of a wireless resource, such as, for example, where a relay station requiring a time slot is added to a communication system, is needed.

SUMMARY

According to an aspect, there is provided a relay station including a message receiving unit to receive a downlink message transmitted from a base station and an uplink message transmitted from a mobile station, a message generation unit to generate a network coded message by coding the downlink message and the uplink message according to a network coding scheme, and a message transmission unit to transmit the network coded message to the base station and the mobile station during the same time slot.

The message receiving unit may receive the downlink message during a first time slot, and receive the uplink message during a second time slot different from the first time slot. The message transmission unit may transmit the network coded message during a third time slot different from the first time slot and the second time slot. The base station may extract the uplink message from the network coded message using the downlink message, and the mobile station may extract the downlink message from the network coded message using the uplink message. The message generation unit may decode the downlink message and the uplink message, encode the decoded downlink message and the decoded uplink message according to any one of a linear code and a non-linear code, and generate the network coded message.

According to another aspect, there is provided a communication apparatus for transceiving data generated according to a data frame, the data frame including a downlink subframe to include a downlink message transmitted to a relay station by a base station, an uplink subframe to include an uplink message transmitted to the relay station by a mobile station, and a coding message subframe to include a network coded message transmitted to the base station and the mobile station by the relay station, the network coded message being generated by the relay station using a network coding scheme based on the downlink message and the uplink message.

The base station may extract the uplink message from the network coded message using the downlink message, and the mobile station may extract the downlink message from the network coded message using the uplink message.

According to still another aspect, there is provided a mobile station including a message transmission unit to transmit an uplink message to a relay station, a message receiving unit to receive a network coded message from the relay station, and a message extraction unit to extract, from the network coded message, a downlink message transmitted from a base station. The relay station may generate the network coded message by coding the uplink message and the downlink message according to a network coding scheme.

The message transmission unit may transmit the uplink message during a first time slot, the base station may transmit the downlink message to the relay station during a second time slot different from the first time slot, and the message receiving unit may receive the network coded message during a third time slot different from the first time slot and the second time slot.

According to yet another aspect, there is provided a base station including a message receiving unit to receive a first uplink message transmitted from a first mobile station and a second uplink message transmitted from a second mobile station, a message generation unit to generate a network coded message by coding the first uplink message and the second uplink message according to a network coding scheme, and a message transmission unit to transmit the network coded message to the first mobile station and the second mobile station during the same time slot.

The message receiving unit may receive the first uplink message and the second uplink message during a first time slot, and the message transmission unit may transmit the network coded message during a second time slot different from the first time slot. The first mobile station may extract the second uplink message from the network coded message using the first uplink message, and the second mobile station may extract the first uplink message from the network coded message using the second uplink message.

According to yet another aspect, there is provided a mobile station including a message transmission unit to transmit a first uplink message to a communication station, a message receiving unit to receive a network coded message from the communication station, and a message extraction unit to extract, from the network coded message, a second uplink message transmitted from a second mobile station. The communication station may generate the network coded message by coding the first uplink message and the second uplink message according to a network coding scheme.

The message transmission unit may transmit the first uplink message during a first time slot, the second mobile station may transmit the second uplink message during the first time slot, and the message receiving unit may receive the network coded message during a second time slot different from the first time slot.

The communication station may transmit the network coded message to the second mobile station, and the second mobile station may extract the first uplink message from the network coded message using the second uplink message.

The communication station may be one of a base station and a relay station.

According to yet another aspect, there is provided a relay station including a message receiving unit to receive a first uplink message transmitted from a first mobile station and a second uplink message transmitted from a second mobile station, a message generation unit to generate a network coded message by coding the first uplink message and the second uplink message according to a network coding scheme, and a message transmission unit to transmit the network coded message to the first mobile station and the second mobile station during the same time slot.

The message receiving unit may receive the first uplink message and the second uplink message during a first time slot, and the message transmission unit may transmit the network coded message during a second time slot different from the first time slot. The first mobile station may extract the second uplink message from the network coded message using the first uplink message, and the second mobile station may extract the first uplink message from the network coded message using the second uplink message.

According to yet another aspect, there is provided a communication system including a base station to transmit a downlink message, a mobile station to transmit an uplink message, and a relay station to generate a network coded message by coding the downlink message and the uplink message according to a network coding scheme, and transmit the network coded message to the base station and the mobile station during the same time slot.

The relay station may transmit, to the base station and the mobile station, information related to at least one of a decoding scheme with respect to the network coded message, a time slot during which the network coded message is transmitted, and a wireless resource allocated for the network coded message.

According to an aspect, there is provided a relay station which reduces a number of time slots needed for transmitting a message to a base station and a mobile station by transmitting a network coded message that is generated according to a network coding scheme, to the base station and the mobile station during the same time slot.

According to an aspect, a base station, a mobile station, and a relay station efficiently utilizes a limited wireless resource by transceiving data generated according to a new data frame having a coding message subframe.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
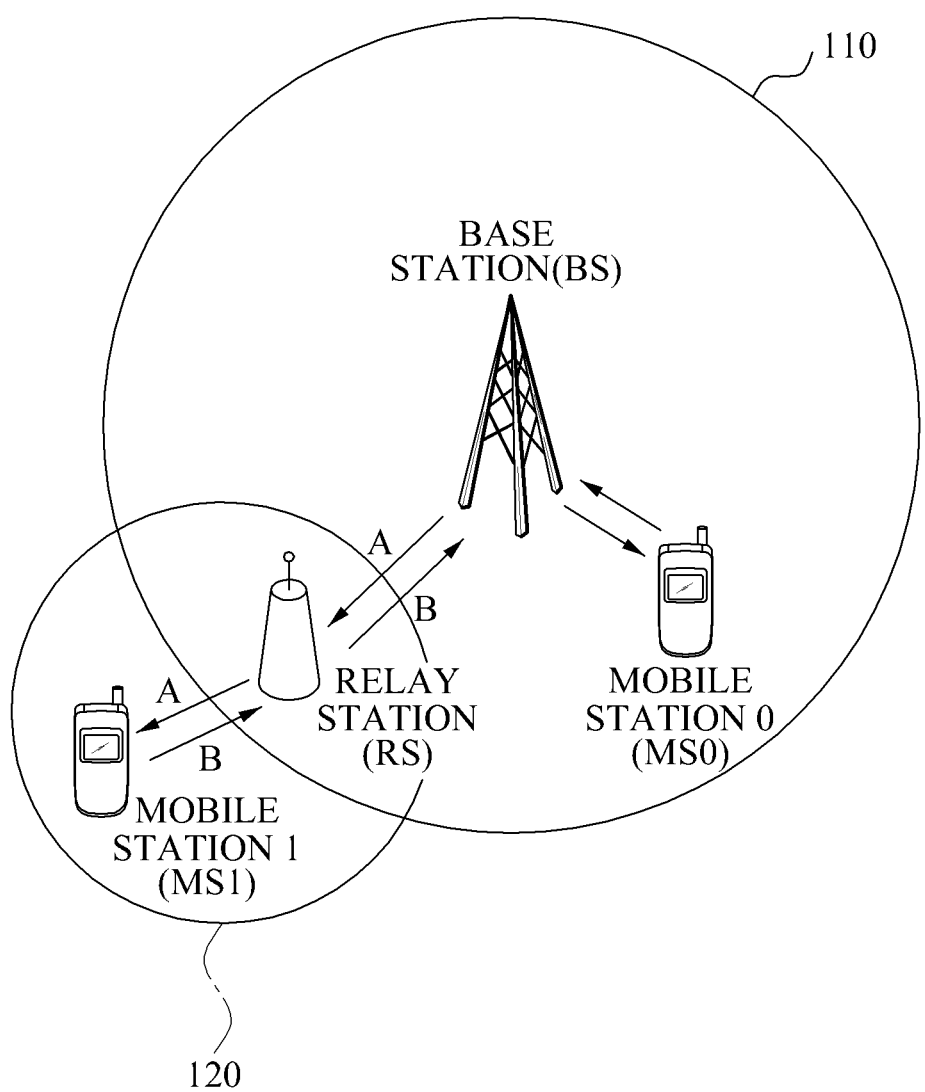
FIG. 1 is a diagram illustrating a communication system having a base station (BS), a relay station (RS), and mobile stations (MSs) according to an exemplary embodiment.

FIG. 1 illustrates a communication system having a base station (BS), a relay station (RS), and mobile stations (MSs) according to an exemplary embodiment.

Referring to FIG. 1, since the MS 0 is included in a cell coverage 110 of the BS, the BS and MS 0 may directly transceive data. Since the MS 1 is outside the cell coverage 110 of the BS, the BS and MS 1 may not directly transceive data, and the BS and MS 1 may transceive the data via the RS.

In a communication system using a Time Division Duplexing (TDD) scheme, a BS transmits data to MSs or an RS during a downlink time slot, and the MSs and RS transmit data to the BS during an uplink time slot.

In this case, in the communication system including the RS, using the TDD scheme, the downlink time slot may be classified into a time slot during which the BS directly transmits the data to MS 0, and a time slot during which the BS transmits the data to the RS. The uplink time slot may be classified into a time slot during which MS 0 directly transmits the data to the BS, and a time slot during which the RS transmits the data to the BS.

Four time slots may be needed so that the BS and the MS 1 may transceive the data via the RS. Specifically, the BS transmits a message A to the RS during a time slot T1 which is one of the downlink time slots. The MS 1 transmits a message B to the RS during a time slot T2 which is one of the uplink time slots. In this case, the RS transmits the message A to the MS 1 during a time slot T3 which is one of the downlink time slots, and transmits the message B to the BS during a time slot T4 which is one of the uplink time slots. Accordingly, four time slots T1, T2, T3, and T4 are needed so that the BS and the MS 1 may transceive the message A and the message B via the RS.

As described below, according to an exemplary embodiment, the time slots T3 and T4 are integrated, and three time slots are used to transceive the messages A and B between the BS and the MS 1 via the RS. Accordingly, a wireless resource is more efficiently used and a data rate may be improved.

While a 2-hop network including the BS-RS-MS is described with reference to FIG. 1, it is understood that teachings herein may be applied to cases where two or more RSs exist between the BS and the MS.

Figure 2:
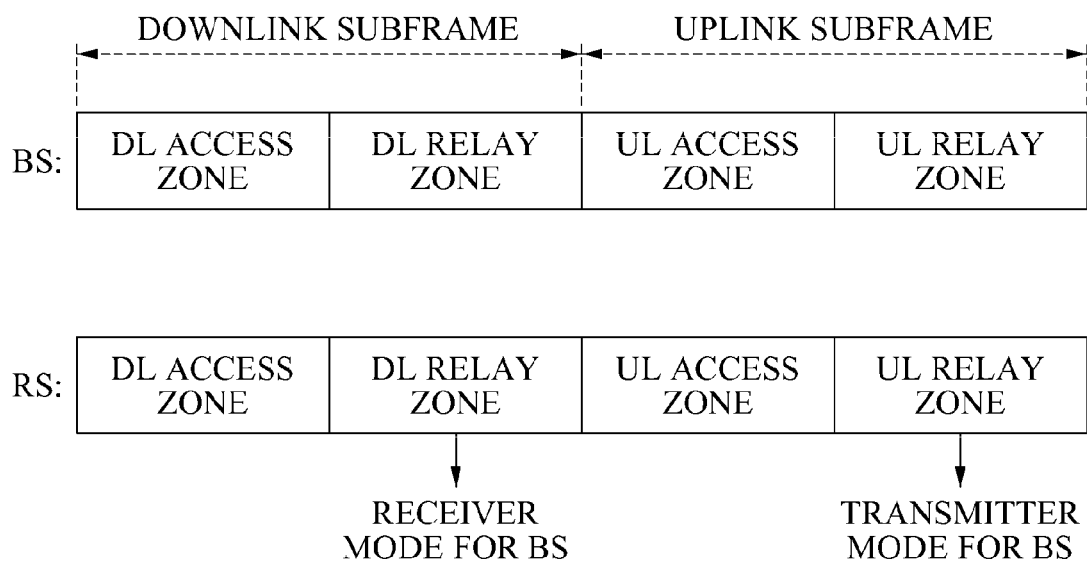
FIG. 2 is a block diagram conceptually illustrating a data frame for a BS and an RS defined in the Institute of Electrical and Electronics Engineers (IEEE) 802.16j standard.

FIG. 2 conceptually illustrates an exemplary data frame for a BS and an RS defined in the Institute of Electrical and Electronics Engineers (IEEE) 802.16j specification.

The data frame for the BS includes a downlink subframe and an uplink subframe. The downlink subframe includes a downlink (DL) access zone and a DL relay zone. The BS directly transmits data to an MS using the DL access zone, and transmits the data to the RS using the DL relay zone.

The uplink subframe of the data frame for the BS includes an uplink (UL) access zone and a UL relay zone. The MS directly transmits the data to the BS using the UL access zone, and the RS transmits the data to the BS using the UL relay zone.

In the data frame for the RS, the RS transmits the data to the MS using the DL access zone. In the DL relay zone of the data frame for the RS, an operating mode of the RS is a receiver mode for the BS. That is, the RS receives the data transmitted from the BS using the DL relay zone of the data frame for the RS.

In the data frame for the RS, the RS receives the data transmitted from the MS using the UL access zone, and transmits the data to the BS using the UL relay zone. In the UL relay zone of the data frame for the RS, an operating mode of the RS is a transmitter mode for the BS.

Figure 3:
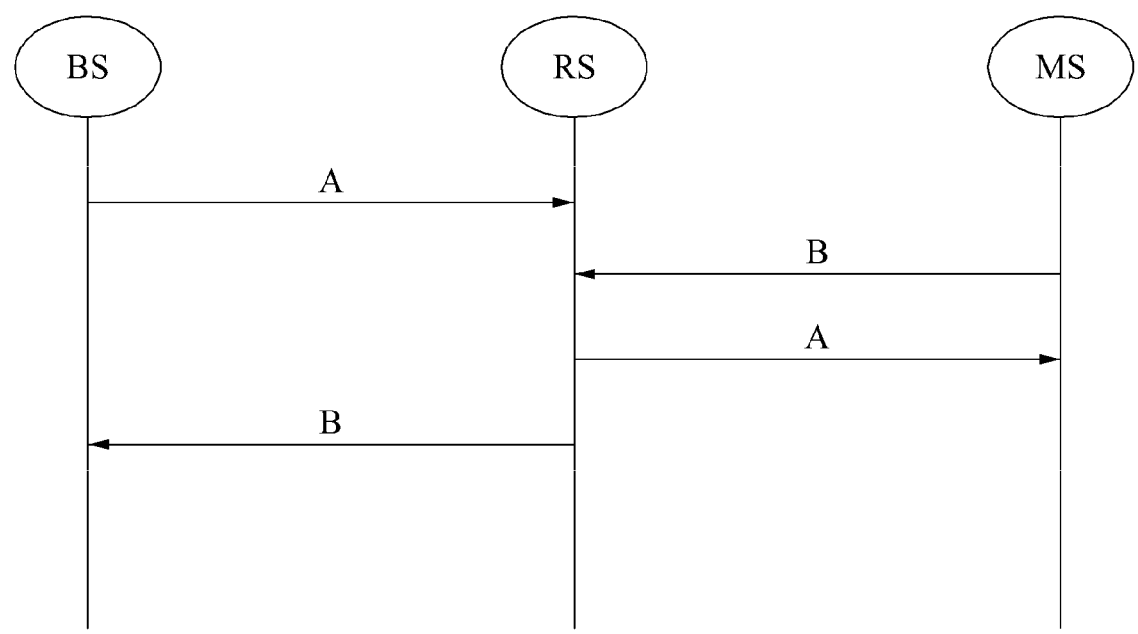
FIG. 3 is a diagram illustrating a flow of a message transceived by a BS, an RS, and an MS according to an exemplary embodiment.

FIG. 3 illustrates a flow of a message transceived by a BS, an RS, and an MS according to an exemplary embodiment.

Referring to FIG. 3, in a communication system using a TDD scheme, the RS receives a message A transmitted from the BS. For example, after the RS receives the message A, the RS receives a message B transmitted from the MS.

The RS transmits the message A received from the BS to the MS. For example, after the RS transmits the message A to the MS, the RS transmits the message B to the BS.

Accordingly, four time slots are used so that the BS may receive the message B and the MS may receive the message A. That is, four time slots such as a time slot during which the BS transmits the message A to the RS, a time slot during which the MS transmits the message B to the RS, a time slot during which the RS transmits the message A to the MS, and a time slot during which the RS transmits the message B to the BS may be needed.

Figure 4:
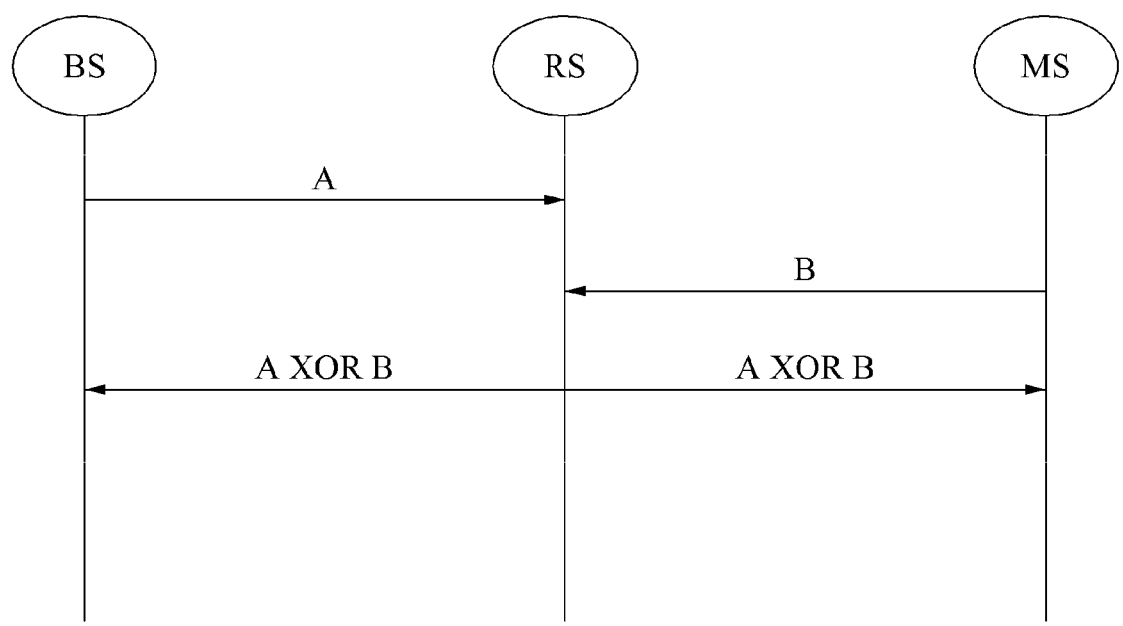
FIG. 4 is a diagram illustrating a flow of a message transceived by a BS, an RS, and an MS according to another exemplary embodiment.

FIG. 4 illustrates a flow of a message transceived by a BS, an RS, and an MS according to another exemplary embodiment.

Referring to FIG. 4, the RS receives a message A transmitted from the BS during a first time slot. Also, the RS receives a message B transmitted from the MS during a second time slot.

In this case, the RS generates a network coded message (A XOR B) by coding the message A and the message B using a network coding scheme. For example, the RS may decode the message A and the message B, and encode the decoded message A and the decoded message B using a linear code, and generate the network coded message (A XOR B).

Also, the RS may simultaneously transmit the generated network coded message (A XOR B) to the BS and the MS during a third time slot.

In this case, since the BS already knows the message A, the BS may extract the message B from the network coded message (A XOR B). Similarly, since the MS already knows the message B, the MS may extract the message A from the network coded message (A XOR B).

Accordingly, the first time slot, the second time slot, and the third time slot are used so that the BS may transmit the message A to the MS and receive the message B via the RS. Therefore, according to the exemplary embodiment, the RS may transmit the network coded message (A XOR B) generated using the network coding scheme to the BS and the MS during the same time slot, thereby reducing a number of required time slots.

Figure 5:
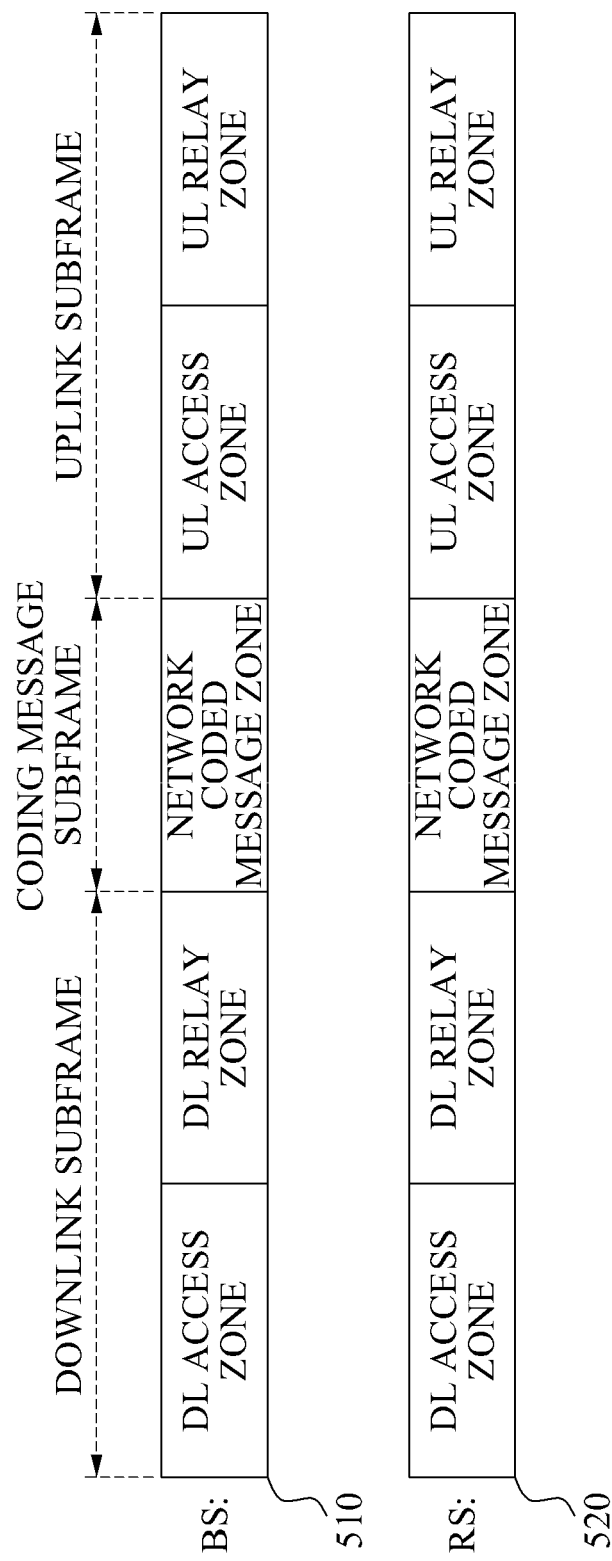
FIG. 5 is a block diagram illustrating data frames for a BS and an RS according to an exemplary embodiment.

FIG. 5 illustrates data frames 510 and 520 for a BS and an RS according to an exemplary embodiment.

Referring to FIG. 5, the data frames 510 and 520 for the BS and the RS includes a downlink subframe, a coding message subframe, and an uplink subframe.

The BS directly transceives data from/to MSs included in a cell coverage using a DL access zone of the downlink subframe. The BS transmits a message to the RS using a DL relay zone.

The RS generates a network coded message by coding messages transmitted from the BS and the MS according to a network coding scheme, and transmits the network coded message included in a network coded message zone to the BS and the MS. The BS and the MS extract the desired data using the network coded message included in the network coded message zone.

The BS directly receives the data transmitted from the MS using an UL access zone of the uplink subframe. The BS receives the data transmitted from the RS using a UL relay zone of the uplink subframe.

Figure 6:
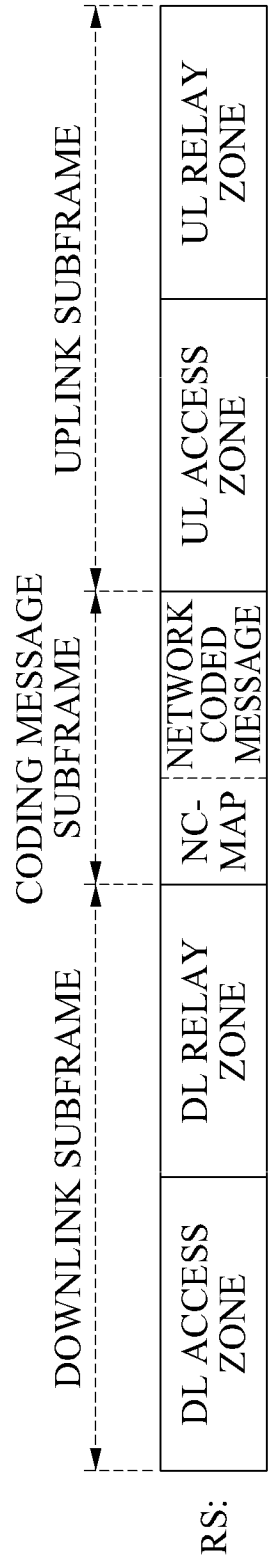
FIG. 6 is a block diagram illustrating an example of the data frame described with reference to FIG. 5.

FIG. 6 illustrates an example of a data frame described with reference to FIG. 5 in more detail.

Referring to FIG. 6, a coding message subframe may include MAP information about a network coded message (NC-MAP) and the network coded message.

In this case, the RS transmits, to the BS and the MS, information related to at least one of a decoding scheme with respect to the network coded message, a time slot during which the network coded message is transmitted, and a wireless resource allocated for the network coded message using the NC-MAP.

Figure 7:
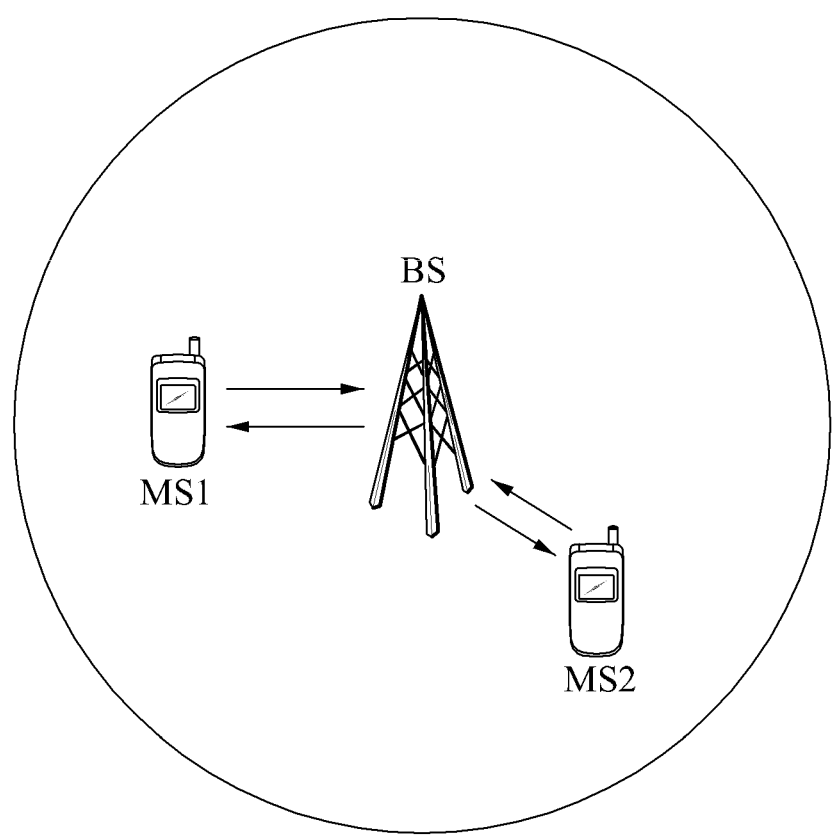
FIG. 7 is a diagram illustrating a communication system having a BS, MS 1, and MS 2 according to an exemplary embodiment.

FIG. 7 illustrates a communication system having a BS, MS 1, and MS 2 according to an exemplary embodiment.

Referring to FIG. 7, the MS 1 and the MS 2 transceive a message with each other via the BS.

MS 1 transmits a first uplink message to the BS during a first time slot. The MS 2 also transmits a second uplink message to the BS during the first time slot.

In this case, the BS generates a network coded message by coding the first uplink message and the second uplink message according to a network coding scheme. For example, the BS decodes the first uplink message and the second uplink message received during the first time slot, encodes the decoded first uplink message and the decoded second uplink message using any one of a linear code and a non-linear code, and generates the network coded message.

The BS transmits the generated network coded message to the MS 1 and the MS 2 during a second time slot different from the first time slot. In this case, since the MS 1 recognizes the first uplink message, the MS 1 may extract, from the network coded message, the second uplink message transmitted from the MS 2. Similarly, since the MS 2 recognizes the second uplink message, the MS 2 may extract, from the network coded message, the first uplink message transmitted from the MS 1.

Figure 8:
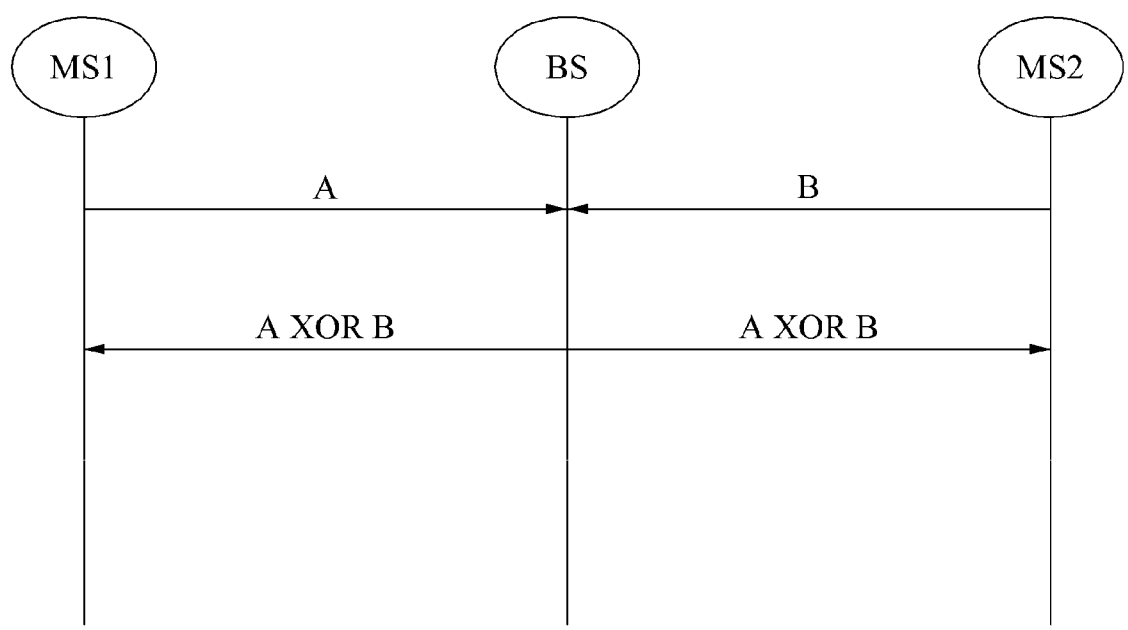
FIG. 8 is a diagram illustrating a flow of a message transceived by a BS, MS 1, and MS 2 according to an exemplary embodiment.

FIG. 8 illustrates a flow of a message transceived by a BS, MS 1, and MS 2 according to an exemplary embodiment.

Referring to FIG. 8, the BS receives a message A transmitted from the MS 1 and a message B transmitted from the MS 2 during the same time slot.

The BS generates a network coded message (A XOR B) by coding the received message A and the received message B according to a network coding scheme. The BS transmits the generated network coded message (A XOR B) to the MS 1 and the MS 2.

In this case, the MS 1 and the MS 2 may respectively extract the message B and the message A from the network coded message (A XOR B).

Though not illustrated, it will be apparent to those skilled in the art that an RS according to an exemplary embodiment may be applied to a communication system having a MS 1 and a MS 2. For example, in a communication system having an RS, a MS1 and a MS2, the RS may receive a message A transmitted from the MS 1 and a message B transmitted from the MS 2 during the same time slot, and generate a network coded message (A XOR B) by coding the received message A and the received message B according to a network coding scheme. The RS may transmit the generated network coded message (A XOR B) to the MS 1 and the MS 2.

The MS 1 and the MS 2 may respectively extract the message B and the message A from the network coded message (A XOR B).

A method of operating an RS according to an exemplary embodiment includes receiving a downlink message transmitted from a BS and an uplink message transmitted from an MS, generating a network coded message by coding the downlink message and the uplink message according to a network coding scheme, and transmitting the network coded message to the BS and the MS during the same time slot.

A method of operating an MS according to an exemplary embodiment includes transmitting an uplink message to an RS, receiving a network coded message from the RS, and extracting, from the network coded message, a downlink message transmitted from a BS using the uplink message. The RS may generate the network coded message by coding the uplink message and the downlink message according to a network coding scheme.

A method of operating a BS according to an exemplary embodiment includes receiving a first uplink message transmitted from a first MS and a second uplink message transmitted from a second MS, generating a network coded message by coding the first uplink message and the second uplink message according to a network coding scheme, and transmitting the network coded message to the first MS and the second MS during the same time slot.

A method of operating an MS according to an exemplary embodiment includes transmitting a first uplink message of a first MS to a BS, receiving a network coded message from the BS, and extracting, from the network coded message, a second uplink message transmitted from a second MS using the first uplink message. The BS may generate the network coded message by coding the first uplink message and the second uplink message according to a network coding scheme.

The methods described above, including certain methods of operating a BS, a RS, and a MS described above, may be recorded, stored, or fixed in one or more computer-readable that includes program instructions to be implemented by a computer to cause a processor to execute or perform the program instructions. The media may also include, alone or in combination with the program instructions, data files, data structures, and the like. The media and program instructions may be those specially designed and constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A relay station comprising:
   a message receiving unit to receive a downlink message transmitted from a base station and an uplink message transmitted from a mobile station;
   a message generation unit to generate a network coded message by coding the downlink message and the uplink message according to a network coding scheme; and
   a message transmission unit to transmit the network coded message to the base station and the mobile station during the same time slot.

2. The relay station of claim 1, wherein the message receiving unit receives the downlink message during a first time slot, and receives the uplink message during a second time slot different from the first time slot.

3. The relay station of claim 2, wherein the message transmission unit transmits the network coded message during a third time slot different from the first time slot and the second time slot.

4. The relay station of claim 1, wherein the base station extracts the uplink message from the network coded message using the downlink message, and
   the mobile station extracts the downlink message from the network coded message using the uplink message.

5. The relay station of claim 1, wherein the message generation unit decodes the downlink message and the uplink message, encodes the decoded downlink message and the decoded uplink message according to any one of a linear code and a non-linear code, and generates the network coded message.

6. The relay station of claim 1, wherein the network coding scheme is used to combine the downlink message and the uplink message into the network coded message.

7. The relay station of claim 1, wherein the message generation unit uses the network coding scheme to code a downlink message A received from the base station and an uplink message B received from the mobile station into a network coded message (A XOR B).

8. A communication apparatus for transceiving data generated according to a data frame, the data frame comprising:
a downlink subframe to include a downlink message transmitted to a relay station by a base station;
an uplink subframe to include an uplink message transmitted to the relay station by a mobile station; and
a coding message subframe to include a network coded message transmitted to the base station and the mobile station by the relay station during the same time slot, the network coded message being generated by the relay station using a network coding scheme based on the downlink message and the uplink message.

9. The communication apparatus of claim 8, wherein the base station extracts the uplink message from the network coded message using the downlink message, and
the mobile station extracts the downlink message from the network coded message using the uplink message.

10. A mobile station comprising:
a message transmission unit to transmit an uplink message to a relay station;
a message receiving unit to receive a network coded message from the relay station; and
a message extraction unit to extract, from the network coded message, a downlink message transmitted from a base station,
wherein the relay station generates the network coded message by coding the uplink message and the downlink message according to a network coding scheme and transmits the network coded message to the base station and the mobile station during the same time slot.

11. The mobile station of claim 10, wherein the message transmission unit transmits the uplink message during a first time slot,
the base station transmits the downlink message to the relay station during a second time slot different from the first time slot, and
the message receiving unit receives the network coded message during a third time slot different from the first time slot and the second time slot.

12. A base station comprising:
a message receiving unit to receive a first uplink message transmitted from a first mobile station and a second uplink message transmitted from a second mobile station;
a message generation unit to generate a network coded message by coding the first uplink message and the second uplink message according to a network coding scheme; and
a message transmission unit to transmit the network coded message to the first mobile station and the second mobile station during the same time slot.

13. The base station of claim 12, wherein the message receiving unit receives the first uplink message and the second uplink message during a first time slot, and
the message transmission unit transmits the network coded message during a second time slot different from the first time slot.

14. The base station of claim 12, wherein the first mobile station extracts the second uplink message from the network coded message using the first uplink message, and
the second mobile station extracts the first uplink message from the network coded message using the second uplink message.

15. A mobile station comprising:
a message transmission unit to transmit a first uplink message to a communication station;
a message receiving unit to receive a network coded message from the communication station; and
a message extraction unit to extract, from the network coded message, a second uplink message transmitted from a second mobile station,
wherein the communication station generates the network coded message by coding the first uplink message and the second uplink message according to a network coding scheme and transmits the network coded message to the communication station and the second mobile station during the same time slot.

16. The mobile station of claim 15, wherein the message transmission unit transmits the first uplink message during a first time slot,
the second mobile station transmits the second uplink message during the first time slot, and
the message receiving unit receives the network coded message during a second time slot different from the first time slot.

17. The mobile station of claim 15, wherein the communication station transmits the network coded message to the second mobile station, and
the second mobile station extracts the first uplink message from the network coded message using the second uplink message.

18. The mobile station of claim 15, wherein the communication station is one of a base station and a relay station.

19. A relay station comprising:
a message receiving unit to receive a first uplink message transmitted from a first mobile station and a second uplink message transmitted from a second mobile station;
a message generation unit to generate a network coded message by coding the first uplink message and the second uplink message according to a network coding scheme; and
a message transmission unit to transmit the network coded message to the first mobile station and the second mobile station during the same time slot.

20. The relay station of claim 19, wherein the message receiving unit receives the first uplink message and the second uplink message during a first time slot, and
the message transmission unit transmits the network coded message during a second time slot different from the first time slot.

21. The relay station of claim 19, wherein the first mobile station extracts the second uplink message from the network coded message using the first uplink message, and
the second mobile station extracts the first uplink message from the network coded message using the second uplink message.

22. A communication system comprising:
a base station to transmit a downlink message;
a mobile station to transmit an uplink message; and
a relay station to generate a network coded message by coding the downlink message and the uplink message according to a network coding scheme, and transmit the network coded message to the base station and the mobile station during the same time slot.

23. The communication system of claim 22, wherein the relay station transmits, to the base station and the mobile station, information related to at least one of a decoding scheme with respect to the network coded message, a time slot during which the network coded message is transmitted, and a wireless resource allocated for the network coded message.

\* \* \* \* \*